(12) United States Patent
Weingarten

(10) Patent No.: US 6,976,668 B2
(45) Date of Patent: Dec. 20, 2005

(54) ROLL DIAPHRAGM CONTROL VALVE

(75) Inventor: Zvi Weingarten, Kibbutz Evron (IL)

(73) Assignee: Bermad, Kibbutz Evron (IL)

( * ) Notice: Subject to any disclaimer, the term of this patent is extended or adjusted under 35 U.S.C. 154(b) by 122 days.

(21) Appl. No.: 10/450,570

(22) PCT Filed: Oct. 28, 2002

(86) PCT No.: PCT/IL02/00863

§ 371 (c)(1),
(2), (4) Date: Jun. 16, 2003

(87) PCT Pub. No.: WO03/038321

PCT Pub. Date: May 8, 2003

(65) Prior Publication Data

US 2004/0036045 A1 Feb. 26, 2004

Related U.S. Application Data

(60) Provisional application No. 60/339,595, filed on Oct. 29, 2001.

(51) Int. Cl.[7] .......................... F16K 1/00; F16K 15/00
(52) U.S. Cl. .................. 251/331; 251/335.2; 137/529; 285/414
(58) Field of Search .................. 251/61, 61.2, 148, 251/331, 335.2; 137/522, 529; 285/368, 285/412, 414, 415; 92/98 D

(56) References Cited

U.S. PATENT DOCUMENTS

| | | | | |
|---|---|---|---|---|
| 3,336,843 A | * | 8/1967 | Griswold | 92/100 |
| 3,477,748 A | * | 11/1969 | Tinsley | 285/267 |
| 4,951,554 A | * | 8/1990 | Scott et al. | 92/103 F |
| 5,002,086 A | * | 3/1991 | Linder et al. | 137/312 |
| 6,216,731 B1 | * | 4/2001 | Frenkel | 137/556 |
| 6,601,604 B1 | * | 8/2003 | Cooper | 137/269 |

* cited by examiner

Primary Examiner—Edward K. Look
Assistant Examiner—John K. Fristoe, Jr.
(74) Attorney, Agent, or Firm—Mark M. Friedman

(57) ABSTRACT

The present invention provides an improved diaphragm control valve with a simplified construction that has significant advantages over prior art diaphragm control valves. Further, the present invention provides substantially straight-through fluid flow which enables a high flow capacity with minimal pressure loss. The non-planar diaphragm of the present invention, when standing in a non-stressed state, is substantially an annulus that assumes a shape with a cross section that extends from a first attachment bead substantially radially in a first direction through a first curve continues substantially non-radially in a second direction through a second curve and continues in a substantially radial direction terminating in a second attachment bead, such that the diaphragm does not fold back on itself. That is to say, the diaphragm is both axially non-overlapping and rotationally symmetrical.

42 Claims, 14 Drawing Sheets

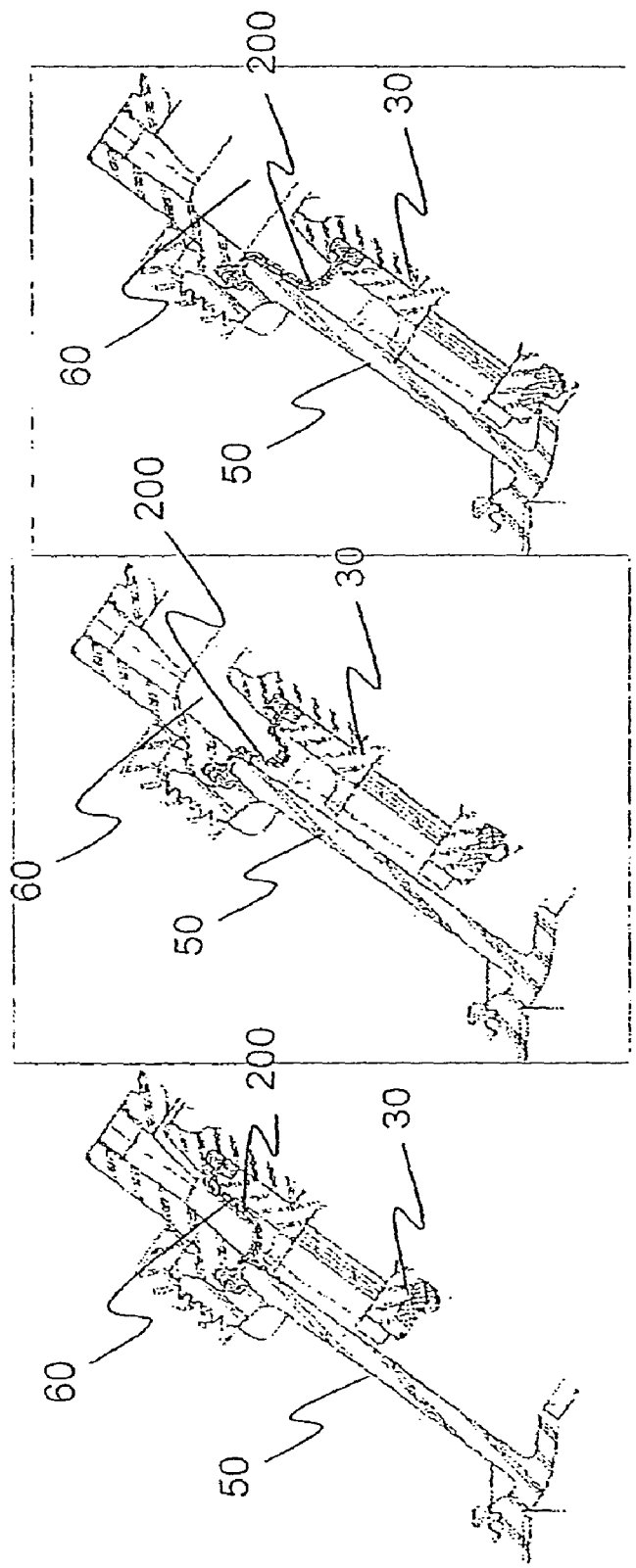

ROLL DIAPHRAGM CONTROL VALVE

This application claims the benefit of Provisional Application No. 60/339,595, filed Oct. 29, 2001.

FIELD AND BACKGROUND OF THE INVENTION

The present invention relates to diaphragm control valves and, in particular, it concerns such a valve with a roll diaphragm that deforms equally in two directions.

A large number of diaphragm control valves have been developed and are available from a variety of manufacturers, such as Bermad, Evron, Israel. In general, these valves comprise an upstream side into which flows a fluid from a fluid source, and a downstream side from which fluid can exit for end use, such as irrigation apparatus, for example. In between the upstream and downstream sides of the valve is a valve seat, against which a valve plug can be sealingly seated. The valve plug slides into and out of a plug housing, and a diaphragm is secured to the valve plug which seals the control chamber from the downstream sides of the valve. The control chamber is fitted with a control port through which the fluid pressure in the control chamber is regulated. By controlling the fluid pressure in the control chamber, the valve plug can be forced against the valve seat to shut off flow of fluid from the upstream side to the downstream side, or the valve plug can be lifted from the valve seat to permit flow of fluid from the upstream side to the downstream side. Regulation of the fluid flow is accomplished by adjusting the fluid pressure in the control chamber so as to maintain the position of the plug in a position between fully open and fully closed.

The range of displacement of the valve plug is directly related to the displacement properties of the diaphragm. That is, the valve plug can move only as much as the diaphragm will allow. The larger the diaphragm, the greater the displacement of the valve plug and therefore the larger the opening through which fluid may flow. In valves of the this type using substantially planar or flat diaphragms that are deformed under pressure so as to be displaced between the open and closed positions, the ratio of valve plug displacement to physical diameter of the diaphragm is relatively small, such that the size of a diaphragm necessary for use is a problem for any size pipe, and becomes particularly impractical with larger pipes, for example.

To overcome the problem of physical diameter, the art has turned to the use of what is known in the art as roll diaphragms. Diaphragms of this type are more compact in that they form substantially a sleeve around the valve plug. A problem encountered with this type of diaphragm is that they are particularly effective in actuating a valve plug in only one direction. Due to the amount of diaphragm material used to form the sleeve, when pressure is applied so as to change the direction of valve plug displacement, the unpredictable shapes into which the roll diaphragm may change, as it turns back on itself, can possibly hinder the movement of other parts of the control valve. As a result, the valve plug must be mechanically biased in one direction (usually closed). There is therefore a need for a diaphragm control valve with a non-planar diaphragm that affects bi-directional displacement of a valve plug by way of fluid pressure.

SUMMARY OF THE INVENTION

The present invention is a diaphragm control valve, with a roll diaphragm that deforms equally in two directions.

According to the teachings of the present invention there is provided, a diaphragm control valve comprising: (a) a valve body with an upstream port and a downstream port, and a valve seat formed between the upstream and downstream ports; (b) a plug housing extending from the valve body between the upstream and downstream ports, at least a portion of an interior volume of the plug housing at least partially defining a control chamber; (c) a displaceable valve plug deployed so as to be displaceable between a closed position, in which a sealing portion of the valve plug abuts the valve seat, and an open position, in which the sealing portion of the valve plug is separated from the valve seat; and (e) a flexible diaphragm sealingly attached to the valve plug, the diaphragm sealing the control chamber from at least a portion of the downstream port, the diaphragm configured such that a distance of the valve plug displacement within the plug housing is at least about forty percent of a diameter of the plug housing.

According to a further teaching of the present invention, there is also provided, a diaphragm support which extends from the valve plug into the control chamber; the diaphragm support configured such that as the diaphragm deforms inwards towards the control chamber the diaphragm support restricts the deformation.

According to a further teaching of the present invention, the valve plug is configured to be slidingly longitudinally displaceable within plug housing.

According to a further teaching of the present invention, a ratio of a thickness of the diaphragm to a radial distance between the valve plug a the plug housing is substantially within a range of 1:4 to 1:7.

According to a further teaching of the present invention, a longitudinal axis of the plug housing and a longitudinal axis of the downstream port form an acute angle.

According to a further teaching of the present invention, at least a portion of the plug housing is integrally formed with the valve body.

According to a further teaching of the present invention, the sealing portion of the valve plug is configured as an elastomeric sealing element.

According to a further teaching of the present invention, the diaphragm is further configured so as to be sealingly attached to at least one wall of the plug housing.

According to a further teaching of the present invention, the control chamber is configured as a substantially cylindrical volume which varies as a function of the displacement of the valve plug.

According to a further teaching of the present invention, the valve plug is configured as a substantially cylindrical element.

According to a further teaching of the present invention, the diaphragm has a substantially S shaped cross section extending between a first attachment bead and a second attachment bead, the diaphragm configured so as to deform toward and away from of the control chamber as the valve plug is displaced between the open and the closed positions According to a further teaching of the present invention, the diaphragm is configured such that in a non-stressed state the diaphragm is axially non-overlapping and rotationally symmetrical.

According to a further teaching of the present invention, the cross sectional S shape is configured such that in a non-stressed state the diaphragm extends from the first attachment bead substantially radially inward in a first direction through a first curve, continues substantially non-radially in a second direction through a second curve and continues in a substantially radially inward direction terminating in a second attachment bead.

According to a further teaching of the present invention, the diaphragm extends substantially perpendicularly from a substantially cylindrical wall of the plug housing and the diaphragm extends substantially perpendicularly from a substantially cylindrical wall of the valve plug.

According to a further teaching of the present invention the attachment of the diaphragm to the substantially cylindrical wall of the plug housing is implemented as entrapment of the first attachment bead of the diaphragm between the plug housing and a plug housing cover such that the control chamber is defined substantially by the plug housing cover, the diaphragm and at least a portion of the valve plug.

According to a further teaching of the present invention, the attachment of the diaphragm to the valve plug is implemented as entrapment of the second attachment bead of the diaphragm between a valve plug body and the diaphragm support.

According to a further teaching of the present invention, the displacement of the valve plug includes displacement of the second attachment bead such that a length of maximum displacement both towards and away from the control chamber is equidistant from the first attachment bead a position of which is stationary.

According to a further teaching of the present invention, the plug housing further comprises a plurality of substantially longitudinal guide ribs configured on at least one side wall so as to guide the displacement of the valve plug.

According to a further teaching of the present invention, the valve plug further comprises a corresponding number of plug guide elements configured to slidingly engage corresponding guide ribs.

According to a further teaching of the present invention, the diaphragm is integrally formed with the valve plug, the diaphragm sealing the plug housing from at least a portion of the downstream, the diaphragm configured so as to deform into and out of the plug housing as the valve plug is displaced between the open and the closed positions.

According to a further teaching of the present invention, the plug housing further comprises a variable valve-plug-restriction element configured vary the amount of displacement of the valve plug into the plug housing.

There is also provided according to a further teaching of the present invention, a diaphragm control valve comprising: (a) a valve body with an upstream port and a downstream port, and a valve seat formed between the upstream and downstream ports; (b) a plug housing extending from the valve body between the upstream and downstream ports, at least a portion of an interior volume of the plug housing at least partially defining a control chamber; (c) a rigid valve plug displaceably deployed within the plug housing, the valve plug being displaceable between a closed position, in which a sealing portion of the valve plug abuts the valve seat, and an open position in which the sealing portion of the valve plug is separated from the valve seat; and (d) a flexible diaphragm integrally molded to the rigid valve plug, the diaphragm sealing the plug housing from at least a portion of the downstream, the diaphragm configured so as to deform into and out of the plug housing as the valve plug is displaced between the open and the closed positions.

According to a further teaching of the present invention, there is also provided, a diaphragm support which extends from the valve plug into the control chamber; the diaphragm support configured such that as the diaphragm deforms inwards towards the plug housing the diaphragm support restrict the deformation to a region between the diaphragm support and at least one wall of the plug housing.

According to a further teaching of the present invention, the diaphragm configured such that a distance of the valve plug displacement within the plug housing is at least about forty percent of a diameter of the plug housing.

According to a further teaching of the present invention, a ratio of a thickness of the diaphragm to a radial distance between the valve plug a the plug housing is substantially within a range of 1:4 to 1:7.

According to a further teaching of the present invention, the valve plug is configured to be slidingly longitudinally displaceable within the plug housing.

According to a further teaching of the present invention, the diaphragm is further configured so as to be sealingly attached to at least one wall of the plug housing.

According to a further teaching of the present invention, a longitudinal axis of the plug housing and a longitudinal axis the downstream port form an acute angle.

According to a further teaching of the present invention, at least a portion of a housing containing the plug housing is integrally formed with the valve body.

According to a further teaching of the present invention, the control chamber is configured as a substantially cylindrical volume which varies as a function of the displacement of the valve plug.

According to a further teaching of the present invention, the valve plug is configured as a substantially cylindrical element.

According to a further teaching of the present invention, the diaphragm extends substantially perpendicularly from a substantially cylindrical wall of the plug housing and the diaphragm extends from a substantially cylindrical wall of the valve plug.

According to a further teaching of the present invention, the attachment of the diaphragm to the substantially cylindrical wall of the plug housing is implemented as entrapment of an attachment bead of the diaphragm between a plug housing and a plug housing cover such that the control chamber is defined substantially by the plug housing cover, the diaphragm and at least a portion of the valve plug.

According to a further teaching of the present invention, the diaphragm is configured such that in a non-stressed state the diaphragm is axially non-overlapping and rotationally symmetrical.

According to a further teaching of the present invention, the diaphragm is configured with a cross sectional S shape such that in a non-stressed state the diaphragm extends from the first attachment bead substantially radially inward in a first direction through a first curve, continues substantially non-radially in a second direction through a second curve and continues in a substantially radially inward direction terminating at the molded attachment to the valve plug.

According to a further teaching of the present invention, the displacement of the valve plug is such that a length of maximum displacement both towards and away from the valve seat is equidistant from the first attachment bead a position of which is stationary.

According to a further teaching of the present invention, the integral formation of the diaphragm with the valve plug further comprises a plurality of spaced apart passages extending longitudinally through a wall of the valve plug.

According to a further teaching of the present invention, the passages extending longitudinally through a wall of the valve plug to a region proximal to the sealing portion of the valve plug and the sealing portion is thereby configured as an elastomeric sealing element integrally formed with the valve plug.

According to a further teaching of the present invention, the plug housing further comprises a plurality of substantially longitudinal guide ribs configured on at least one side wall so as to guide the displacement of the valve plug.

According to a further teaching of the present invention, the valve plug further comprises a corresponding number of guide elements configured to slidingly engage corresponding guide ribs.

According to a further teaching of the present invention, the plug housing further comprises a variable valve-plug-restriction element configured vary the amount of displacement of the valve plug into the plug housing.

There is also provided according to a further teaching of the present invention, a diaphragm control valve comprising: (a) a valve body with an upstream port and a downstream port; (b) a plug housing extending from the body between the upstream and downstream ports; (c) a valve plug displaceably deployed within the plug housing; (d) a diaphragm sealingly attached to the valve plug; (e) at least one connection surface configured on at least one of the upstream and downstream ports; (f) an adapter connected to the at least connection surface; and (g) a flange which fits over the adapter so as to connect the valve to a flow conduit, the interface of the flange and the adapter being configured such that the flange and the adapter have corresponding generally spherical shaped surfaces, such that the flange is provided generally spherical freedom of movement about the adapter.

According to a further teaching of the present invention, the at least one connection surface is at least two connection surfaces such that at least one of the upstream and downstream ports is configured with thread on portions of both an inside surface and an outside surface so as to be connectable to any one chosen from the group including: inside diameter pipe thread, flanged and flange adapter, PVC glue pipe adapter.

There is also provided according to a further teaching of the present invention, a connecting flange comprising: (a) a substantially flat circular collar with a plurality of circumferentially spaced apart radially elongated bolt slots, the collar configured so as to interconnect with a connection interface deployed at a first end of the connection flange; and (b) a connection adapter deployed within the collar, the connection adapter configured so as to interconnect with a connection interface deployed at a second end of the connection flange; wherein the interface of the collar and the adapter is configured such that the collar and the adapter have corresponding generally spherical shaped surfaces, such that the collar is provided generally spherical freedom of movement about the adapter.

BRIEF DESCRIPTION OF THE DRAWINGS

The invention is herein described, by way of example only, with reference to the accompanying drawings, wherein:

FIGS. 6a–6g are details of area A of FIG. 6, which in series illustrate a pattern of deformation of the diaphragm of the first embodiment of the present invention as the valve plug moves from a closed position to an open position an back to a closed position;

DESCRIPTION OF THE PREFERRED EMBODIMENTS

The present invention is diaphragm control valve with a roll diaphragm that deforms equally in two directions.

The principles and operation of diaphragm control valve according to the present invention may be better understood with reference to the drawings and the accompanying description.

By way of introduction, the discussion herein is with regard to two preferred embodiments of the present invention. While there are structure differences between the two embodiments, the principles of operation according to the teachings of the present invention are the same in both embodiments.

The present invention provides an improved diaphragm control valve with a simplified construction that has significant advantages over prior art diaphragm control valves. Further, the present invention provides substantially straight-through fluid flow which enables a high flow capacity with minimal pressure loss. While the preferred embodiments discussed herein are intended for fabrication from molded polymers, the principles of the present invention may be applied with equal benefit to valves constructed of any suitable material.

Valves of the present invention have a diaphragm which deforms in response to a difference in pressure, between the control chamber side of the diaphragm and the downstream side of the diaphragm. The diaphragm inflates, rolls and changes shape in both directions. That is to say, the diaphragm deforms both towards the control chamber side and towards the downstream side. The non-planar configuration of the diaphragm allows for a long range of displacement into and out of the control chamber, thereby providing a long stroke for the valve plug within the valve body.

Figure 12:
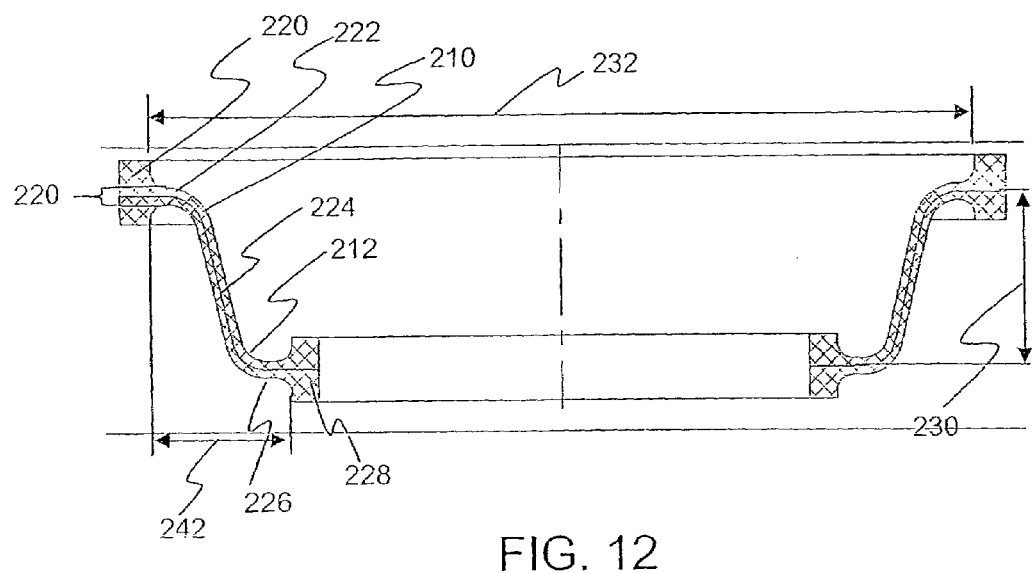
FIG. 12 is a cross sectional view of the diaphragm of the embodiment of FIG. 1.
Figure 13:
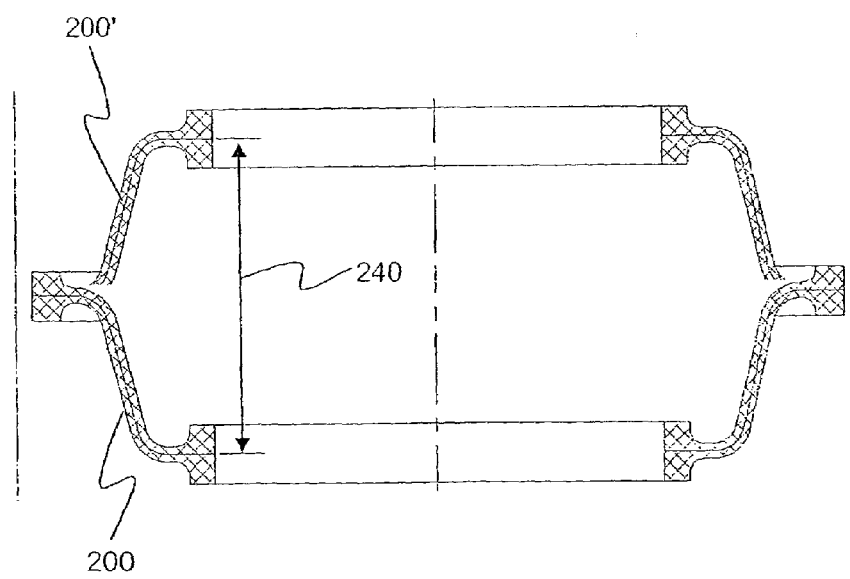
FIG. 13 is a composite view of two over-lying cross sectional views of the diaphragm of FIG. 12, shown with each of the two layers illustrating full diaphragm extension in opposite directions.

Unlike the roll diaphragms of prior art, which have curves with short radii and portions of the diaphragm turn back on itself so as to contact other portions of the diaphragm, the roll diaphragm of the present invention, when standing in a non-stressed state, is substantially an annulus that assumes a shape with a cross section that is substantially "S" shaped that does not fold over on itself. That is to say, the diaphragm 200 is both axially non-overlapping and rotationally symmetrical. As illustrated in FIG. 12, the substantially S shaped cross section is configured with a first curve 210 and a second curve 212, with the first curve and the second curve being interconnected. That is to say, the diaphragm extends from a first attachment bead 220 substantially radially 222 in a first direction through a first curve 210 continues substantially non-radially in a second direction 224 through a second curve 212 and continues in a substantially radial direction 226 terminating in a second attachment bead 228. The interconnectedness may be such that the two curves are spaced a distance apart, as illustrated here in region 224. Alternatively the interconnectedness may be such that the two curves are contiguous, that is to say region 224 may be implemented as a point of inflection between two curves. Thus configured, the longitudinal distance 230 between the central plane of the first attachment bead and the central plane of the second attachment bead is at least 20 percent of the diameter 232 of the diaphragm. This allows for an overall displacement in both directions equal to at least 40 percent 240 (FIG. 13) of the diameter of the diaphragm. The ratio of the thickness 220 of the diaphragm 200 to the radial distance 242 between the parallel cylinders upon which the two attachment beads lie falls within a range of 1:4 to 1:7 and is preferably, about 1:5. As a result of this thickness the radius of each of the curves is large in relation to the curves of conventional roll diaphragms, as mentioned above. As illustrated in FIG. 13 the diaphragm of the present invention will assume substantially minor image cross section when fully extended in each direction. Configured thusly, when pressure is applied to the diaphragm it will deform substantially uniformly in either direction in such a manner that substantially no portion of the diaphragm comes into contact with another portion of the diaphragm. This results in a larger diaphragm surface area upon which pressure may be applied that is provided by the roll diaphragms on prior art. Further, in a preferred case in which a reinforcing layer (generally of fabric) is incorporated into the diaphragm, the thickness of the elastomer is preferably distributed substantially equally on both sides of the reinforcing layer, diaphragm displacement is substantially equal in either direction for equal amounts of pressure. This results in a diaphragm that is able to withstand pressure applied from either side, unlike roll diaphragms of prior art that have an asymmetric configuration of elastomer on the reinforcing layer.

FIGS. 6a–6g. in series, illustrate deformation of the diaphragm 200 as the valve plug 30 moves from a closed position with substantially no pressure being applied (6a) to an open position (6d) and from an open position (6e) to a closed position (6g).

Figure 6:
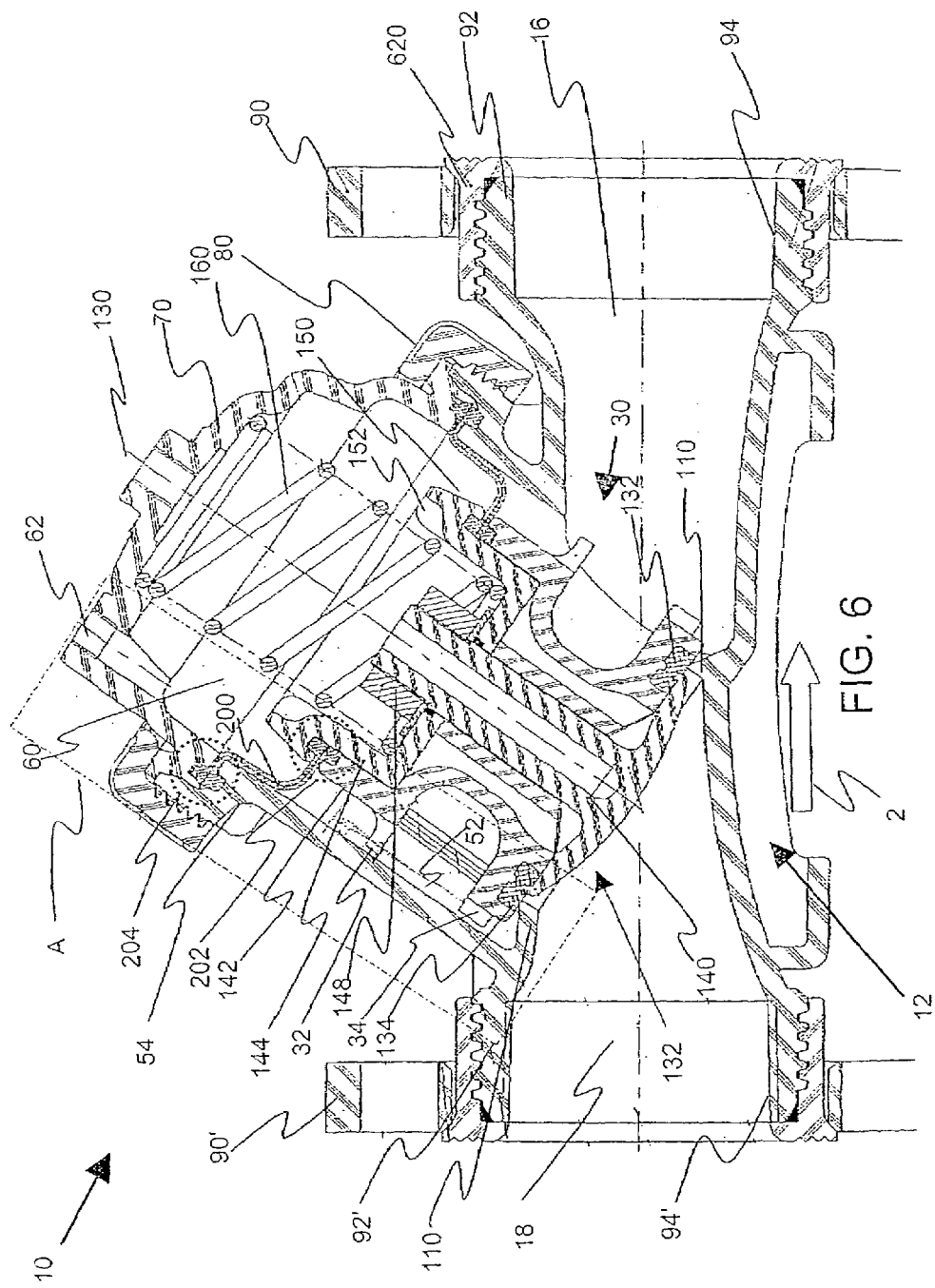
FIG. 6 is a longitudinal cross sectional view of the embodiment of FIG. 1.
Figures 6A, 6B, 6C, 6D:
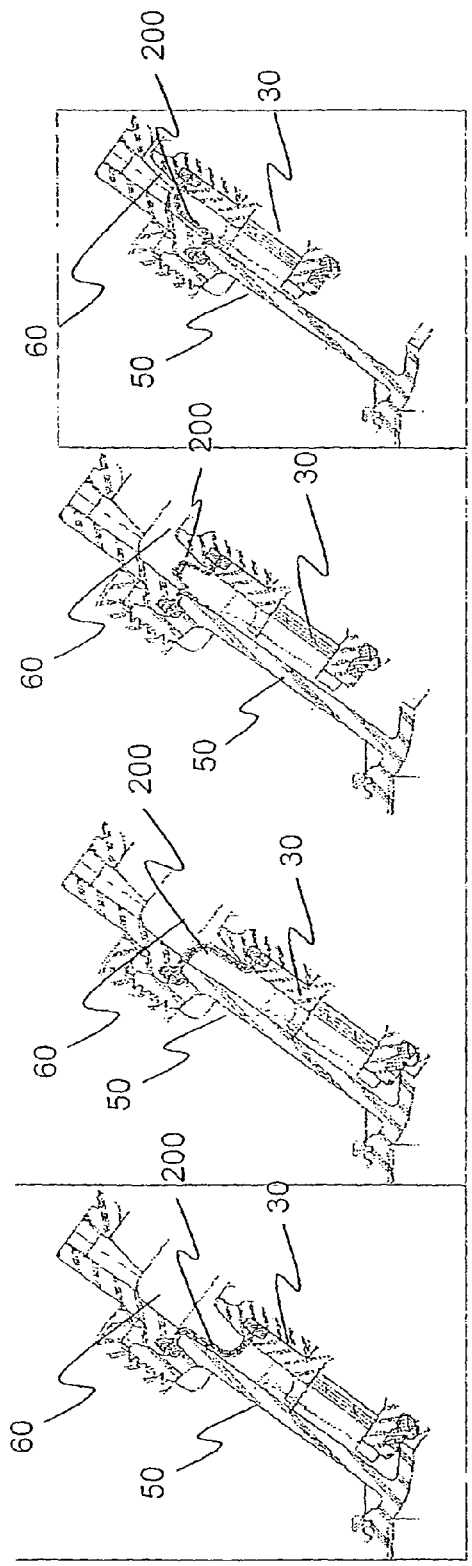

As illustrated in FIGS. 6 and 6a, the valve plug sealing surface 134 is seated against the valve seat 110 and the valve is closed, i.e., no fluid can flow from the upstream port 18 to the downstream port 16. The diameter of the valve plug 30 at its bottom surface 132, i.e., the portion which seats against the valve seat 110, is less than the diameter of the control chamber 60 above the diaphragm 200, i.e., the inside diameter of the cover 70. The difference in diameters means that pressure is applied surfaces with differing surface areas. Therefore, if the pressure inside the control chamber 60 is the same as the pressure in the upstream port 18, the net force on the control chamber side of the diaphragm 60 and the valve plug 30, which has the greater surface area, (i.e., the force pushing the valve plug 30 against the valve seat 110) is greater than the force on the upstream side of the valve plug 30 (i.e., the force pushing the valve plug 30 away from the valve seat 110). It is also appreciated that the force pushing the valve plug 30 against the valve seat 110 may still be greater than the force pushing the valve plug 30 away from the valve seat 110, even if the pressure at the upstream side is slightly greater than the pressure inside control chamber 60, depending of course on the difference in the surface areas to which the pressure is applied and the magnitude of the pressure at the upstream side. It should be noted that the force of the spring 160 also adds to the force pushing the valve plug 30 against the valve seat 110. The pressure at the downstream port 16 may be atmospheric, for example.

In FIG. 6b, the pressure in the control chamber 60 is lowered by any one of the pressure control devices known in the art which is in fluid communication with the control port 62. In FIG. 6c. the pressure in the control chamber 60 is lowered to the point that the pressure at the upstream side acting on the lower portion 132 of the valve plug 30 overcomes the force pushing the valve plug 30 against the valve seat 110, and the valve plug 30 moves away from the valve seat 110. Once the valve plug 30 moves away from the valve seat 110, fluid flows from the upstream port 18 to the downstream port 16. This increases the pressure from the downstream side on the diaphragm 200, thereby further increasing the force which acts to push valve plug 30 away from valve seat 110, thus further opening the passage for fluid from upstream port 18 to downstream port 16. The pressure at the downstream port 16 acts against diaphragm 200 such that diaphragm 200 deforms into the control chamber 60 (6c). As is seen, the diaphragm support 150 prevents the diaphragm 200 from inflating inwards. It will be appreciated that the fluid flow may be regulated by adjusting the fluid pressure in the control chamber 60 so as to maintain the position of the valve plug 30 in a position between fully open and fully closed.

FIG. 6d illustrates the valve 10 fully open. A comparison of FIGS. 6e 6g illustrates the deformation of the diaphragm 200 as the valve plug 30 is displace from an open position to a closed position. The general operation of the two embodiments herein described are essentially the same.

Further, the valve of the present invention has at least one structural element configured on the valve plug for controlling the inflation and rolling motion of the diaphragm. These structural elements include a cylindrical diaphragm support structure 150 extending from the top of the valve plug into the control chamber. In the preferred embodiment discussed here, the extension is in a direction that is substantially parallel to the axis of the valve plug. Thus, the diaphragm support structure moves together with the valve plug, unlike the prior art in which the diaphragm control structures are statically placed in the plug housing.

The valve of the present invention also includes a flange-adapter with a substantially spherical interface which reduces or eliminates stress on the flange, adapter or inlet and outlet end couplings of the valve when attaching the upstream or downstream sides of the valve to piping.

Figure 1:
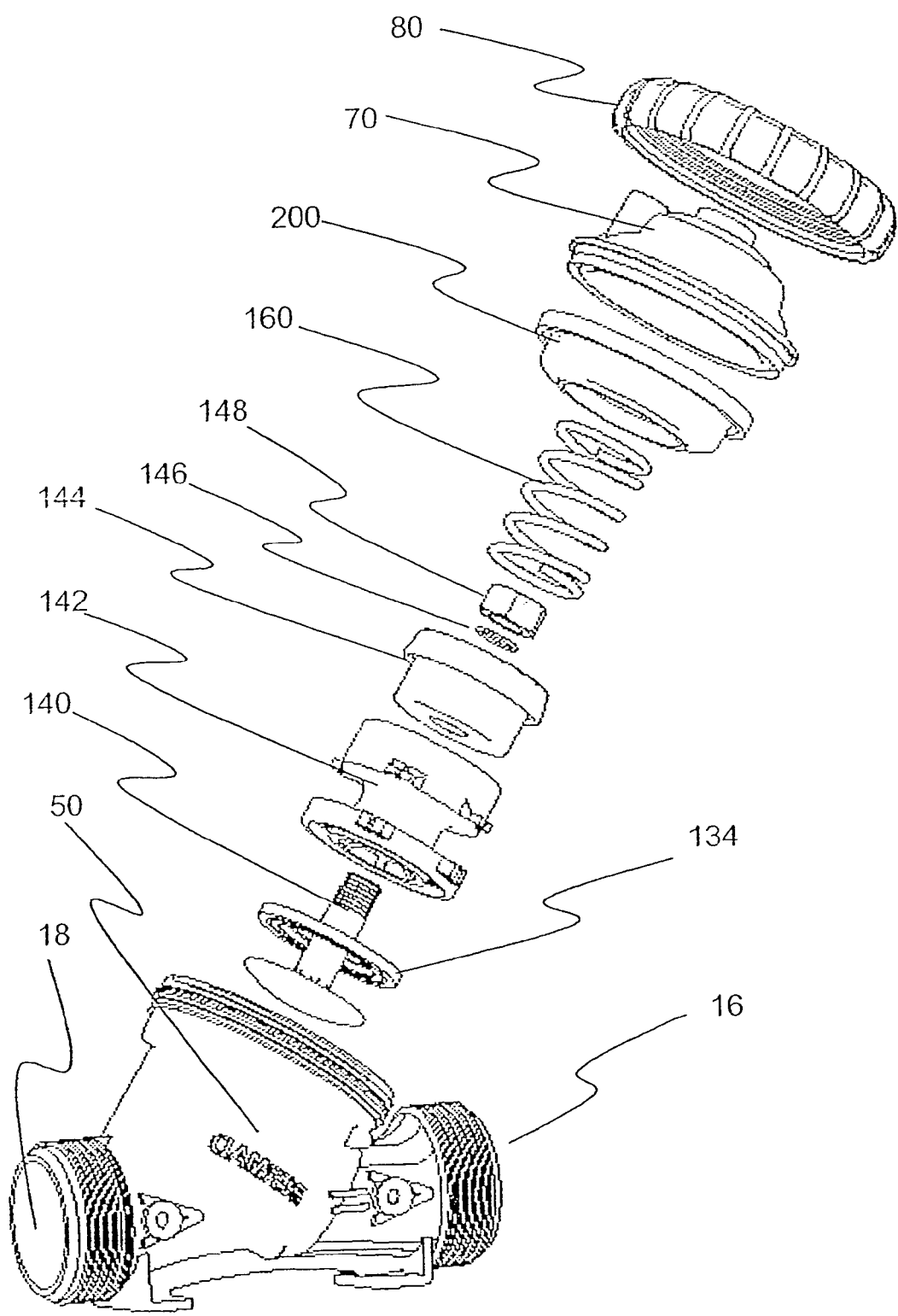
FIG. 1 is an exploded perspective view of a first preferred embodiment of a diaphragm control valve constructed and operative according to the teachings of the present invention.
Figure 2:
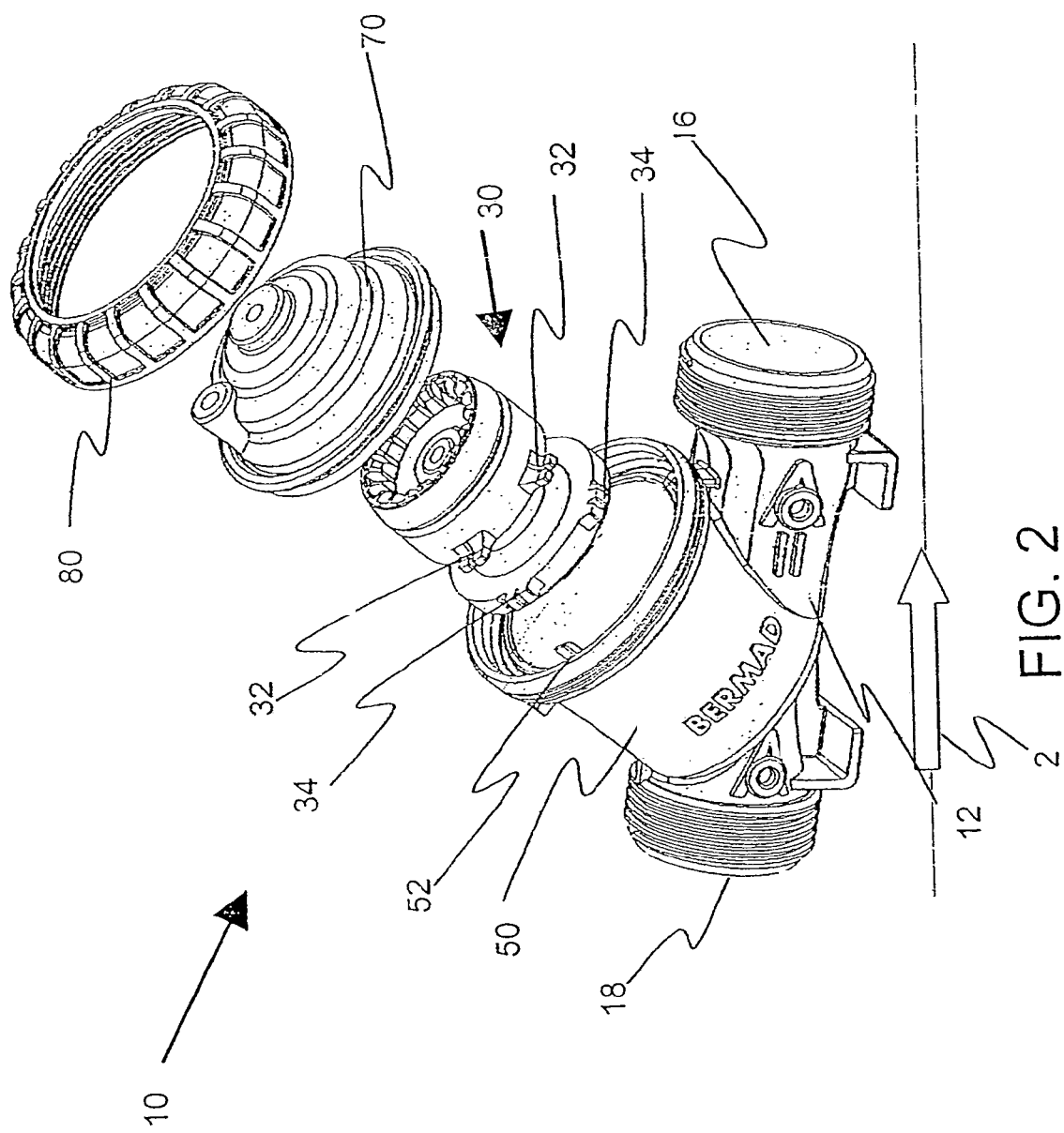
FIG. 2 is an exploded perspective view of the preferred embodiment FIG. 1, shown without the diaphragm and spring for clearity.
Figure 3:
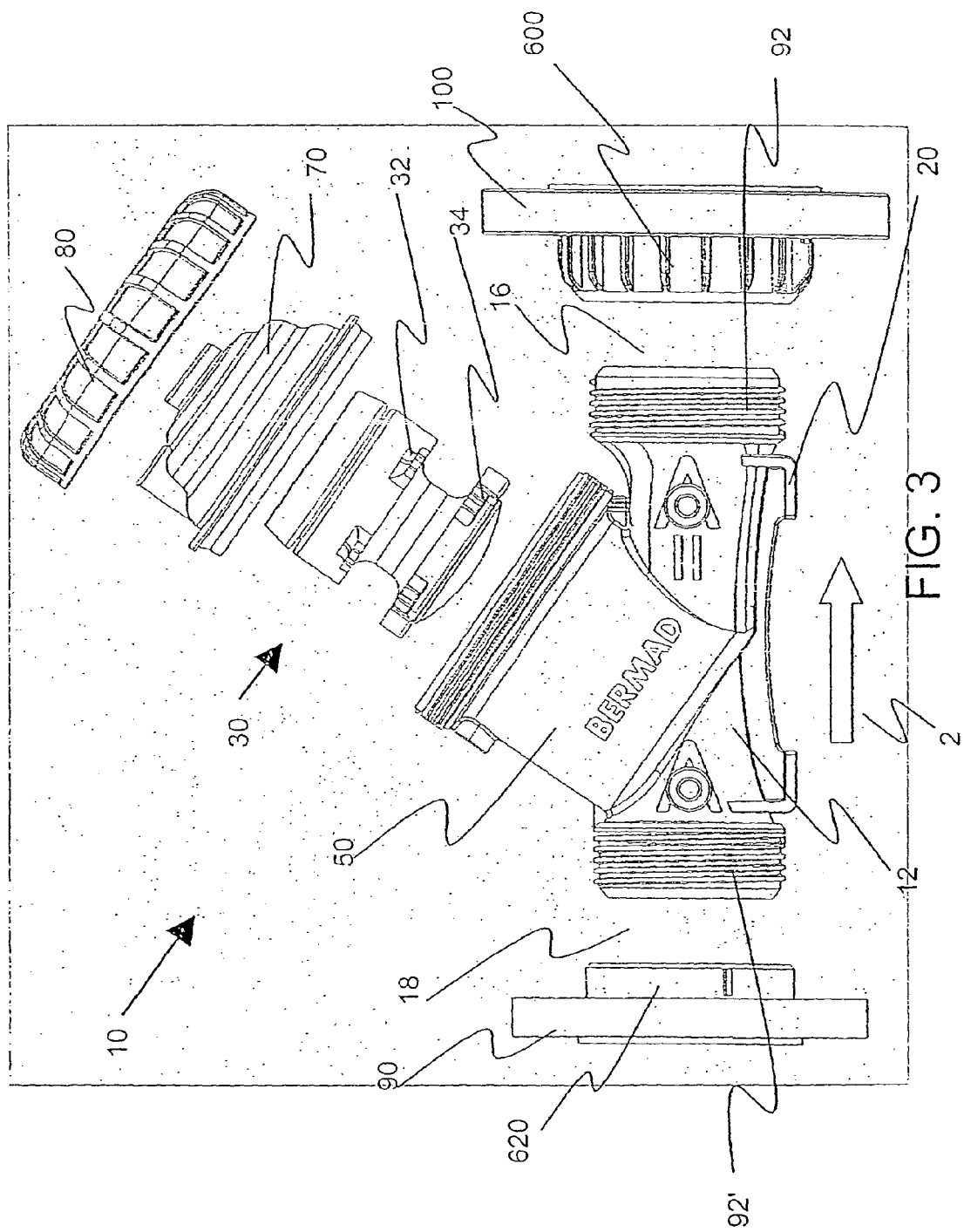
FIG. 3 is a side elevation of FIG. 2, shown with a three-inch flange adapter and a four-inch flange adapter.

Referring now to the drawing, FIGS. 1 and 2 clearly show a number of the structural elements of a first preferred embodiment of a diaphragm control valve 10 of the present invention. As illustrated here, the plug housing 50 extends from the valve body 12 such that an acute angle is formed by the longitudinal axis of the plug housing 50 and the longitudinal axis of the downstream port 16. Circumferentially spaced about the valve plug 30 are plug guide elements 32 and 34 that are configured to slidingly engage the guide ribs 52, which are circumferentially spaced about the cylindrical wall of the plug housing 50. The plug housing cover 70 is configured so as to be secured by a cover ring 80. This cover ring 80 further serves to stiffen and strengthen the plug housing 50. The valve body 12 preferably includes a valve body bracket 20 for securing the valve body to a deployment surface (not shown) when necessary. It should be noted that the direction of fluid flow is indicated by arrow 2 in each of the figures where such indication is required The side elevation of FIG. 3 is identical to FIG. 2 and is numbered accordingly. Also shown, by non-limiting example, are three-inch 90 and four-inch 100 flanges and adapters, both of which are configured for connection to the exterior threads 92 and 92' of the upstream 18 and downstream 16 ports respectively. It should be noted that flanges and adapters to fit substantially any size pipe is within the intention of the present invention.

Figure 4:
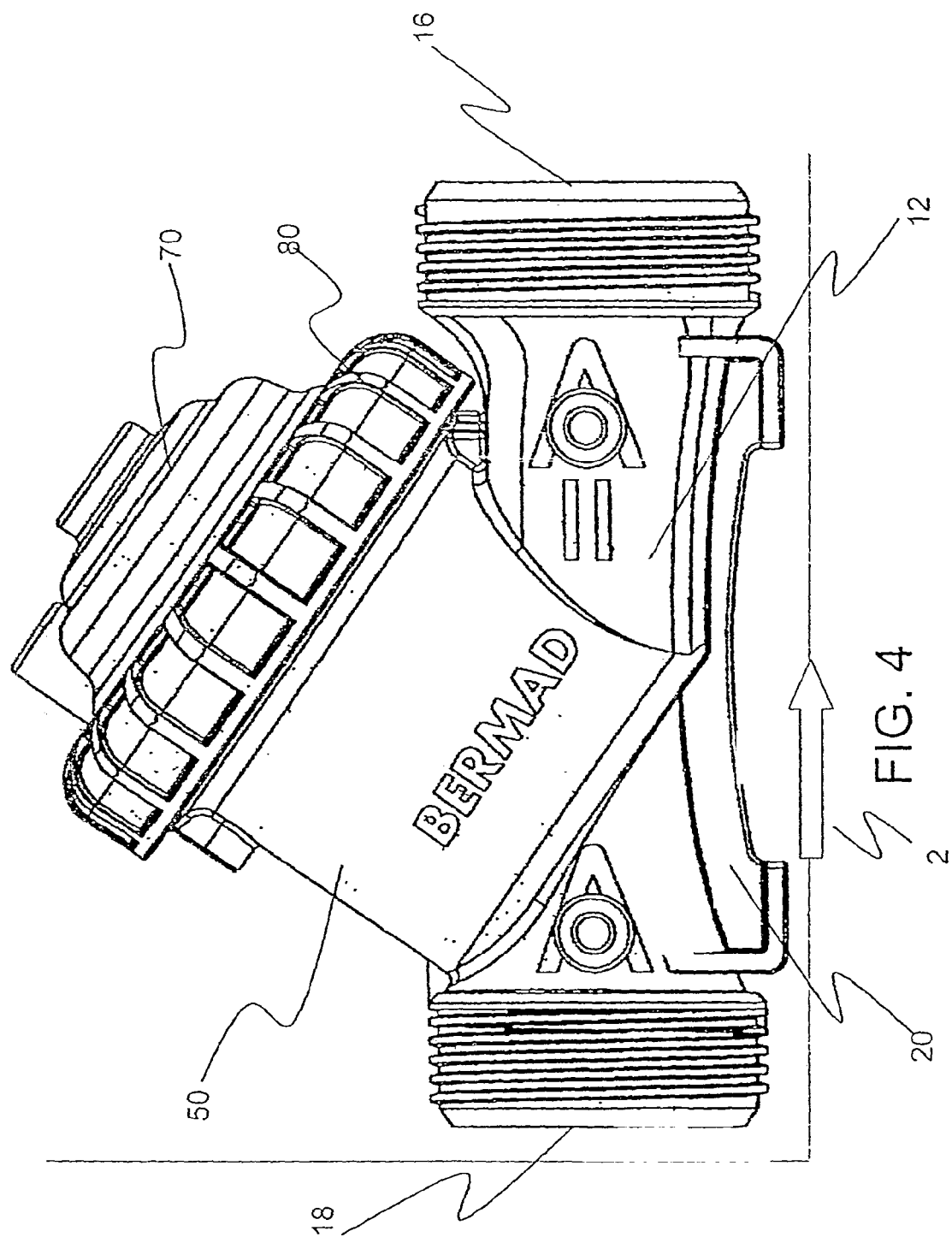
FIG. 4 is a side elevation of an assembled diaphragm control valve of the embodiment of FIG. 1.

The assembled diaphragm control valve of FIG. 4 illustrates the relative compactness of a valve of the present invention.

Figure 5:
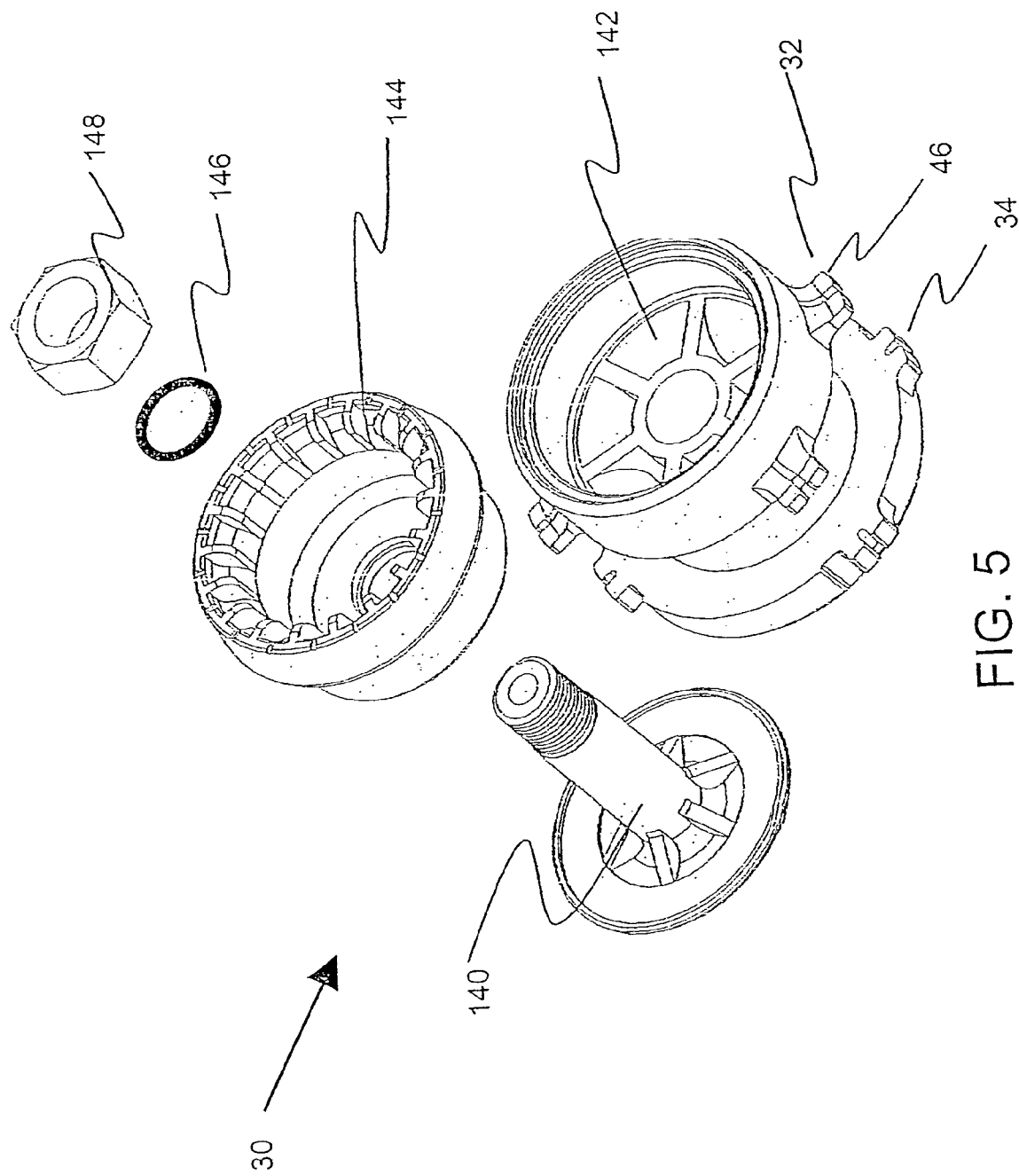
FIG. 5 is an exploded perspective view of the structural elements of a valve plug constructed and operative according to the teachings of the embodiment of FIG. 1.

FIG. 5 illustrates major structural elements of the valve plug of this first embodiment of the present invention. More clearly show here are the plug guide elements 32 and 34. The plug guide elements are aligned in pairs of a top 32 and a bottom 34 guide element. As the valve plug 30 is inserted into the plug housing 50, the plug guide elements 32 and 34 are aligned with the guide ribs 52 configured on the cylindrical wall of the plug housing 50. This configuration restricts rotational movement of the valve plug 30. Further, the extreme surface 46 of the plug guide elements 32 and 34 slidingly abuts the cylindrical wall of the plug housing 50 thereby restricting latitudinal movement of the valve plug 50.

Turning now to the general structure of the diaphragm control valve 10 of this first embodiment of the present invention with regard to FIG. 6, the valve body 12 includes a cylindrical upstream port 18 and a cylindrical downstream port 16 each of which is threaded about an outside cylindrical surface 92' and 92 respectively so as to be attachable to flanged adapters, such as, but not limited to, three-inch 90 and four-inch 100 pipe flanges. Both the upstream 18 and downstream 16 ports further include threading about an inside cylindrical surfaces 94' and 94 respectively so as to attachable to, for example, threaded pipe (not shown) and adapters for use with non-threaded PVC pipe (not shown). Valve 10 is illustrated here in connection to three-inch flanged adapters 90 and 90'. Configured within the valve body between the upstream 18 and downstream 16 ports is a valve seat 110. Extending from the valve body 12 an orientation substantially perpendicular to the plane of the valve seat 110, is a substantially cylindrical plug housing 50. The terminal extremity 54 of the plug housing 50 is preferably configured about an inner surface for engagement with a plug housing cover 70 and threaded about an outer surface for engagement with the cover ring 80.

Slidingly deployed within the plug housing 50 is a substantially cylindrical valve plug 30. As mentioned above, the valve plug includes plug guide elements 32 and 34 that engage the guide ribs 52 configured on the cylindrical wall of the plug housing 50. Thus deployed, the valve plug 30 substantially limited to longitudinal movement along an axis 130 that is substantially perpendicular to the plane of the valve seat 110. The bottom surface 132 of the valve plug 30 includes a sealing surface 134 configured to align with the valve seat 110 such that when that valve plug is deployed in a closed position, as illustrated here in FIG. 5, fluid is not allowed to flow from the upstream port 18 to the downstream port 16 through the valve seat 110. The sealing surface 110 of this first embodiment is preferably an elastomeric ring entrapped between the valve plug stem 140 and the valve plug body 142.

Extending between the cylindrical wall of the plug housing 50 and the valve plug 30 is a diaphragm 200. The diaphragm 200 seals the control chamber 60 from the downstream port 16, and flexibly defines, in concert with the top surface of the valve plug 30 and the interior surface of the plug housing cover 70, the varying volume of the control chamber 60, as will be discussed below.

The diaphragm 200 is attached to the valve plug 30 by entrapment between a first set of attachment surfaces 202 configured on the valve plug body 142 and the valve plug top 144. The attachment surfaces of the diaphragm and the valve plug are configured such that the diaphragm 200 extends from the valve plug 30 substantially perpendicular to the cylindrical wall of the valve plug body 142. The diaphragm 200 is further attached to the cylindrical wall of the plug housing 50 by entrapment between a second set of attachment surfaces 204 configured on the terminal extremity of the plug housing 50 and the plug housing cover 70. Here too, the attachment surfaces of the diaphragm 200, plug housing 50 and plug housing cover 70 are configured such that the diaphragm 200 extends from the entrapment surfaces 204 substantially perpendicular to the cylindrical wall of the plug housing 50. The preformed substantially S shaped cross section of the diaphragm provides a uniform and predictable shape of shape as the diaphragm deforms between an opening configuration and a closing configuration.

The valve plug top 144 is configured with a substantially cylindrical outer surface that extend above the diaphragm into the control chamber thereby forming a diaphragm support structure 150 as mentioned above. The extreme terminal surface 152 of the valve plug top 150 is configured so as to contact the plug housing cover 70 when the valve plug 30 is displaced to the open position, thereby establishing an upper limit of the longitudinal displacement of the valve plug 30. Deployed between the valve plug top 150 and the plug housing cover 70 is a spring 160 which biases the valve plug 30 toward the valve seat 110 so as to augment the pressure applied to the valve plug 30 in the closed position, thereby enhancing the sealing contact between the sealing surface 134 of the valve plug 30 and the valve seat 110.

For ease of assembly and maintenance, the diaphragm 200 and the major structural element of the valve plug 30 are held in place by entrapment on the valve plug stem 140, between the bottom surface 132 of the valve plug stem 140 and the valve plug retaining nut 148. Once assembled the valve plug 300 is inserted into the plug housing 50 and the diaphragm 200 is attached to the plug housing 50 as the cover 70 is installed.

Figure 7:
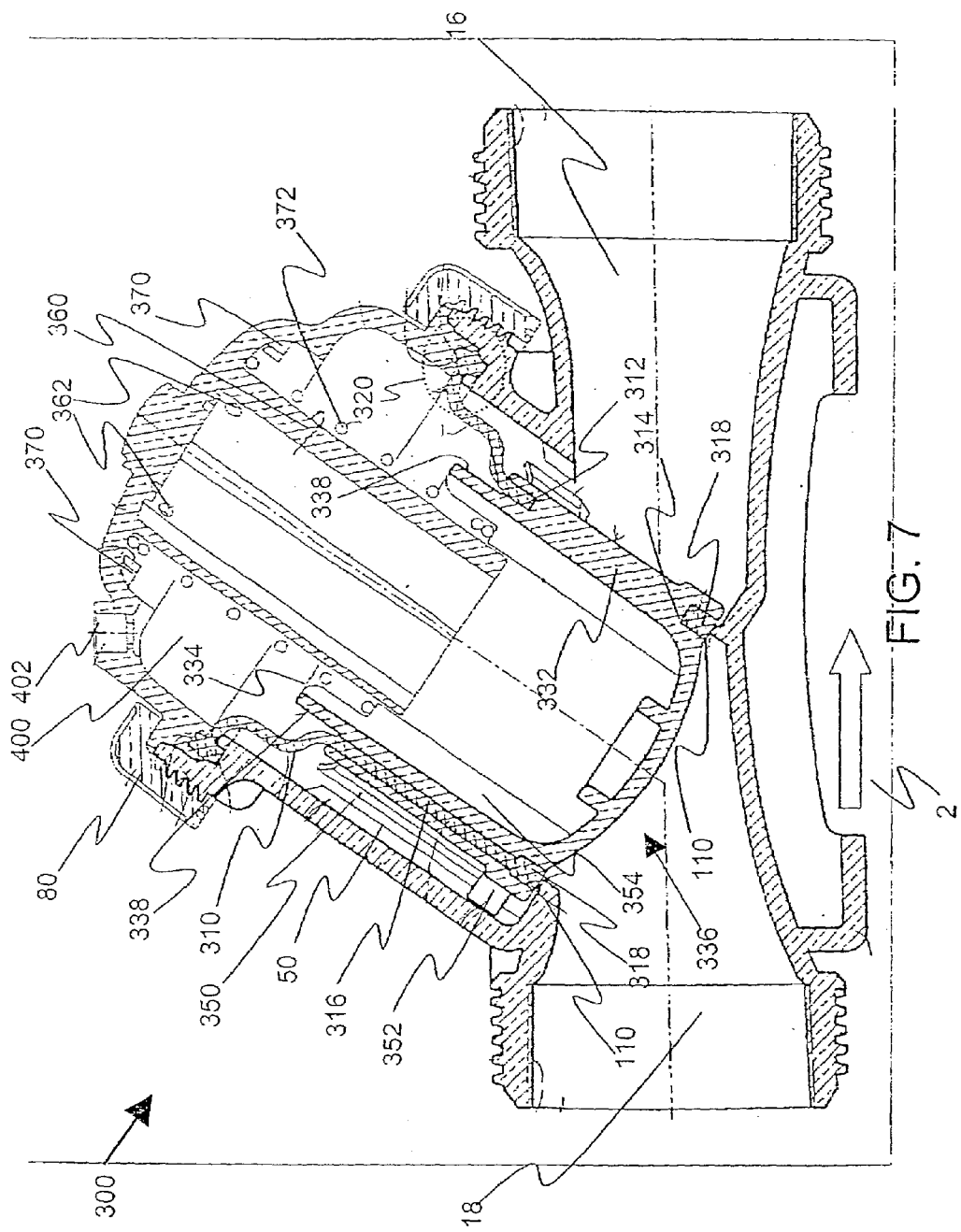
FIG. 7 is a longitudinal cross sectional view of a second preferred embodiment of a diaphragm control valve constructed and operative according to the teachings of the present invention, shown here in a closed state.

Reference is now made to a second preferred embodiment, generally referred to by 300, of the present invention is FIG. 7. As illustrated here, the valve body 12, upstream 18 and downstream 16 ports, the valve seat 110, plug housing 50 and cover ring 80 are essentially the same as describe with regard to the first embodiment above and are numbered correspondingly.

A major feature of this second embodiment is that the valve plug 330 and the diaphragm 310 are integrally formed as a single structural element. This is achieved by the valve plug 330 being configured with attachment elements such that the preferably elastomeric material of the diaphragm 310 is molded directly onto the valve plug 330. The attachment elements illustrated here by non-limiting example only, include top 312 and bottom 314 grooves that circumscribe the valve plug 330 and a plurality of radially spaced apart passages 316 that extend longitudinally through the cylindrical wall 332 of the valve plug 330 so as to connect the top 312 and bottom 314 grooves. In this embodiment, the elastomeric material molded into the bottom groove 314 forms the valve plug sealing surface 318.

The diaphragm 310 is attached to the cylindrical wall of the plug housing 50 by entrapment between a set of attachment surfaces 320 configured on the terminal extremity of the plug housing 50 and the plug housing cover 70. As in the first preferred embodiment, the attachment surfaces of the diaphragm 310, plug housing 50 and plug housing cover 70 are configured such that the diaphragm 310 extends from the from the attachment surfaces 320 substantially perpendicular to the cylindrical wall of the plug housing 50. The diaphragm 310 is configured such that a radial length of the diaphragm 310 between the attachment region 320 and the valve plug is greater than a radial distance 322 between the attachment region 320 and valve plug 330. This "excess" diaphragm material allows the diaphragm 310 to deform as the valve plug is displaced between the open and closed positions, as discussed above.

The plug housing 50 includes guide ribs 350 as discussed with regard to the first embodiment above. The valve plug 330 includes single corresponding valve plug guide elements 352 configured around the bottom region of the cylindrical wall of the valve plug 330. Additionally the valve plug 330 includes inner plug guides 354 configured to align with a substantially cylindrical cover guide element 360 extending longitudinally from the plug housing cover 70. The cover guide element 360 preferably includes air holes 362 to allow equalization of pressure when the valve plug 330 is displaced into the plug housing 400 to an open position.

The plug housing cover 70 may include valve plug stoppers 370 configured to contact the extreme terminal surface 334 of the valve plug 330, thereby stopping further longitudinal displacement of the valve plug into the plug housing. Turning to the general operation of the present invention, discussed with regard to the second preferred embodiment 300. The displacement of the valve plug 330 is responsive to a pressure differential between the control chamber 400 and the downstream port 16. The pressure in the control chamber 400 may be varied by any of a number of control devices known in the art that are responsive to a variety parameters such as but not limited to, pressure is a single pressurized region, and pressure differential between two or more pressurized regions, for example, inlet pressure and/or outlet pressure and/or other parameters. The details of various control devices are well known in the art, and are not part of the present invention. The change in pressure in the control chamber may be affected by fluid communication with the control chamber 400 through a control port 402. As illustrated here, by non-limiting example, the control port 402 is included in the plug housing cover 70.

Figure 8:
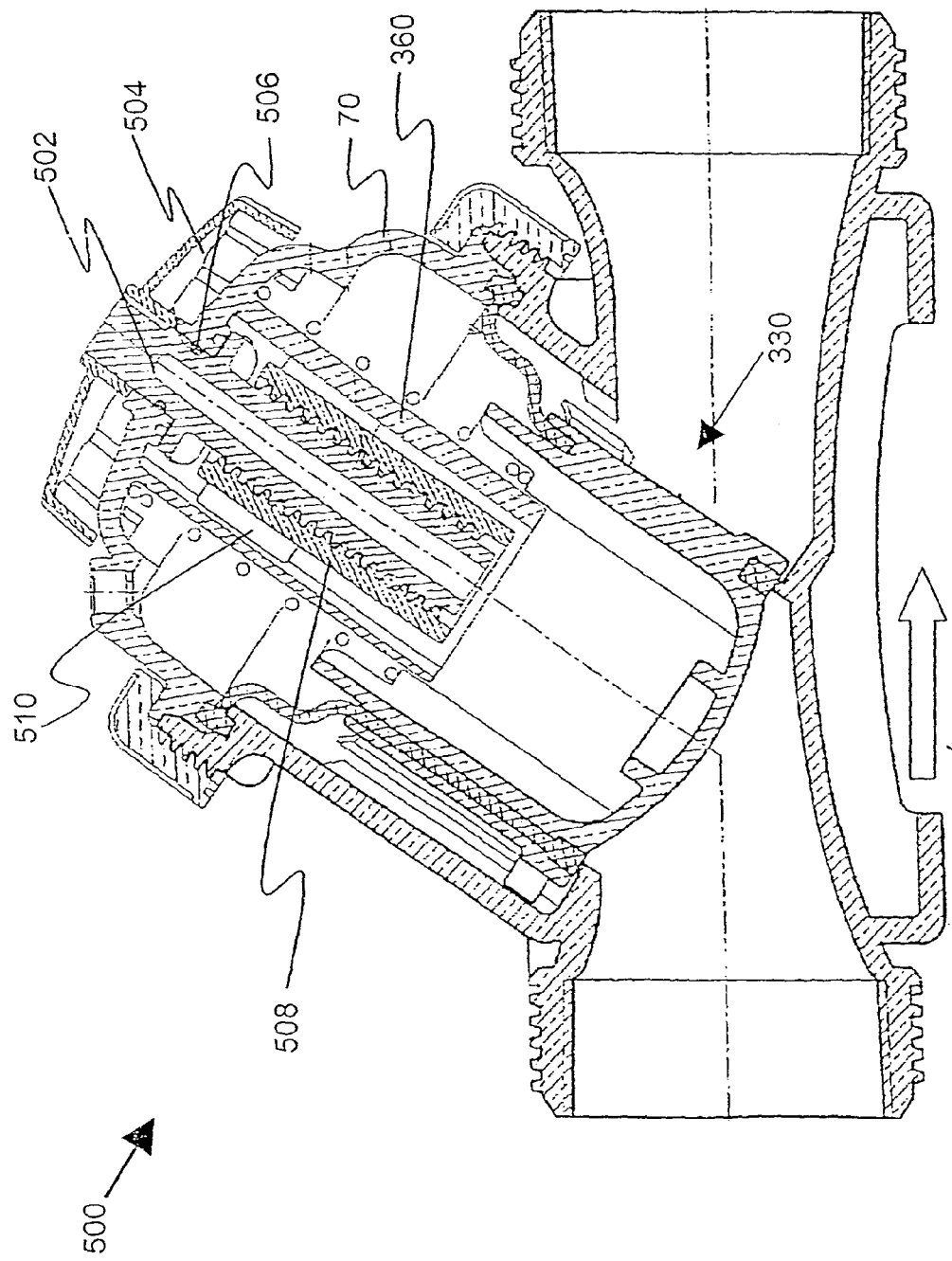
FIG. 8 is a longitudinal cross sectional view of the embodiment of FIG. 6, shown with a flow handle constructed and operative according to the teachings of the present invention.

Reference is now made to FIG. 8, which illustrates a third preferred embodiment of a diaphragm control valve 500 of the present invention. The diaphragm control valve 500 of this embodiment is constructed essentially the same as diaphragm control valve 300 of the second embodiment, with corresponding elements being correspondingly numbered. Diaphragm control valve 500 differs from diaphragm control valve 300 in that diaphragm control valve 500 further includes a flow stem 502 deployed within the control chamber 400. The flow stem 502 is preferably male-threaded and extends through the plug housing cover 70 interconnecting with a flow handle 504. An O-ring 506 preferably seals the flow stem 502 with respect to the plug housing cover 70. A flow stem stopper 508 is preferably threadedly attached to flow stem 502. By appropriate turning of the flow handle 504, the flow stem stopper 503 can be moved up or down the flow stem 502. Preferably the flow the flow stem stopper 508 is configured with flow stem stopper ribs 510 which substantially prevent rotation of the flow stem stopper 508 within the cover guide element 360. The purpose of flow stem stopper 508 is to vary the limit of travel of valve plug 330 and thereby regulate the maximum flow of a fluid through the valve 500.

Figure 9:
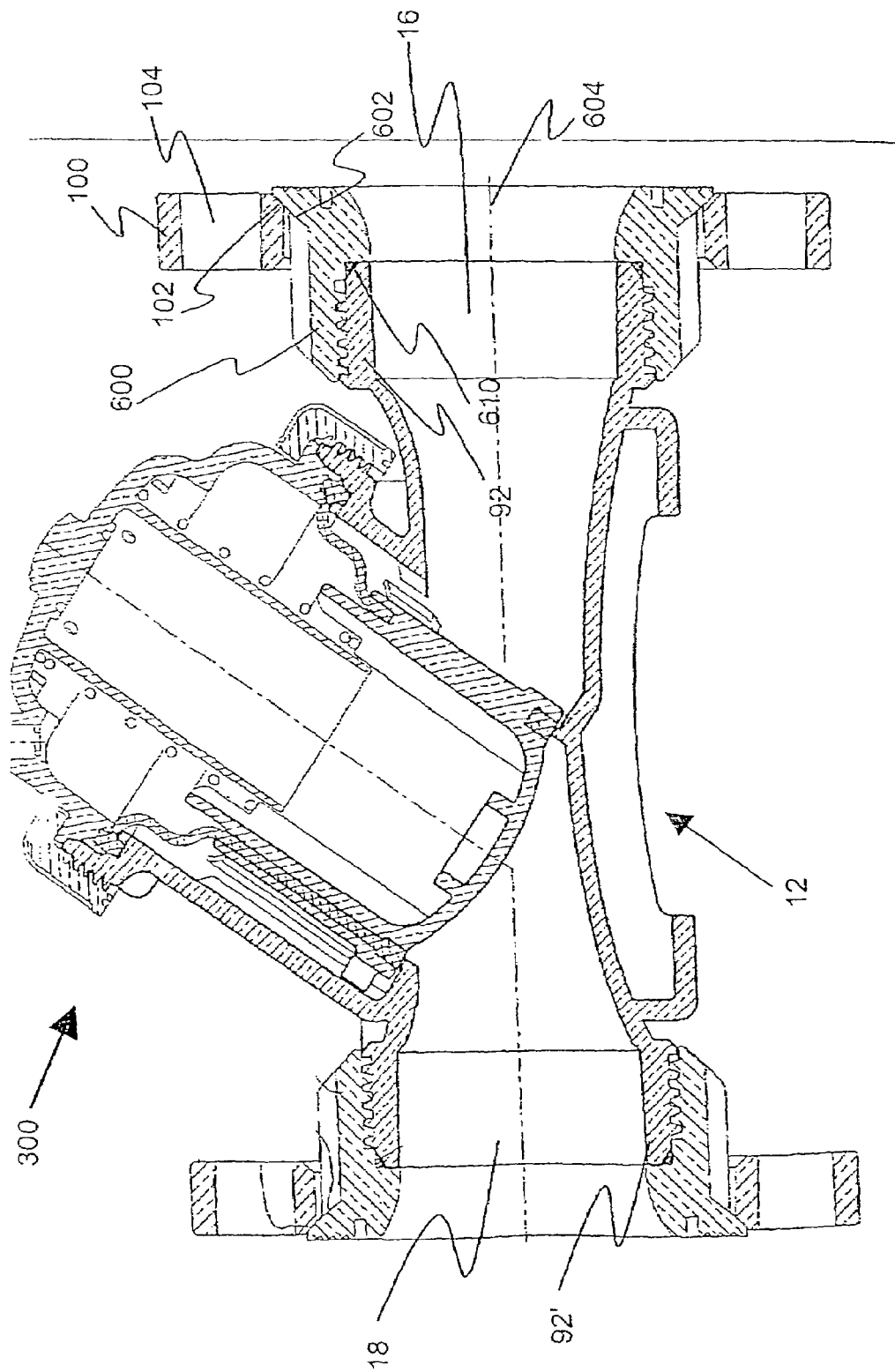
FIG. 9 is a longitudinal cross sectional view of the embodiment of FIG. 6, shown with four-inch flange adapters constructed and operative according to the teachings of the present invention.
Figure 10:
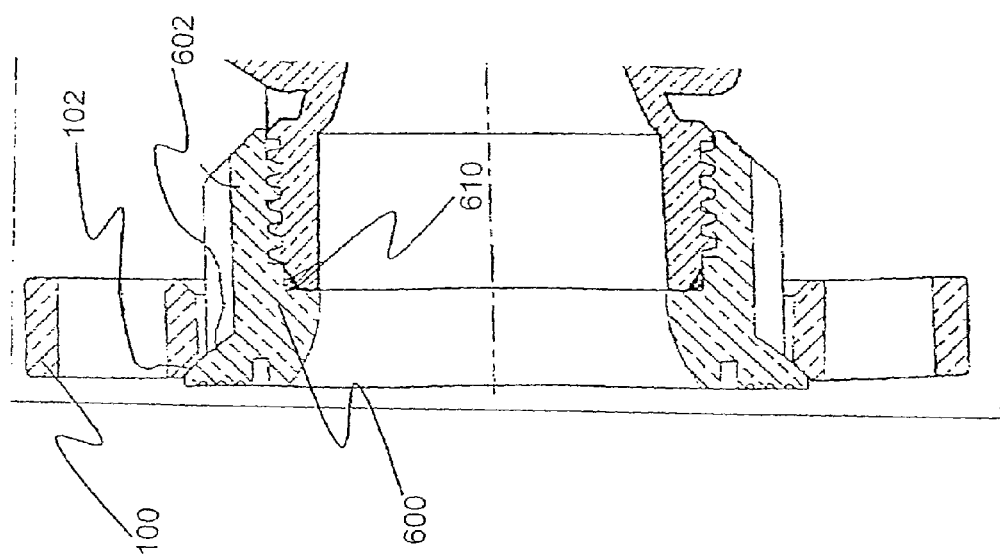
FIG. 10 is a detail of the four-inch flange adapter of FIG. 9.

Looking now at FIGS. 9 and 10 (detail of FIG. 9) that illustrate a four-inch flange 100 and adapter 600, which serves as a non-limiting example of a flange and adapter configuration that is useful with any of the diaphragm control valves of the present invention described herein. It should be noted that the 3 inch and 4 inch flange assemblies are merely given as examples, and it will be appreciated that the present invention can be implemented for substantially any desired pipe diameter, from very small diameters up to very large diameters. The flange 100 and adapter 600 are illustrated together with the second embodiment of a diaphragm control valve 300. It should be further noted that use of the flange and adapter of the present invention need not be limited to use solely with valve bodies of the present invention, and would be equally beneficial for any application where a flange fitting is required. The adapter 600 are preferably screws on to the external flange adapter threads 92 and 92' at the upstream 18 or downstream 16 port of the valve body 12. The connection may be sealed with an O-ring 610.

The flange 100 fits over the adapter 600. The flange 100 is configured with a generally spherical surface 102 which abuts a correspondingly shaped spherical surface 602 configured on the adapter 600. The generally spherical interface between the flange 100 and the adapter 600 permits the flange 100 to freely move substantially spherically about the adapter, and to rotate about a longitudinal axis 604 of the upstream and downstream valve body ports 18 and 16. This permits attaching the upstream or downstream ports 18 or 16 of the valve body to the piping without placing stress on flange 100, adapter 600 or vale body. This also allows rotating the flange 100 freely about longitudinal axis 604, so as to permit easy alignment of the mounting holes 104 of the flange 100 with the mounting holes or bolt studs of the pipeline (not shown).

Figure 11:
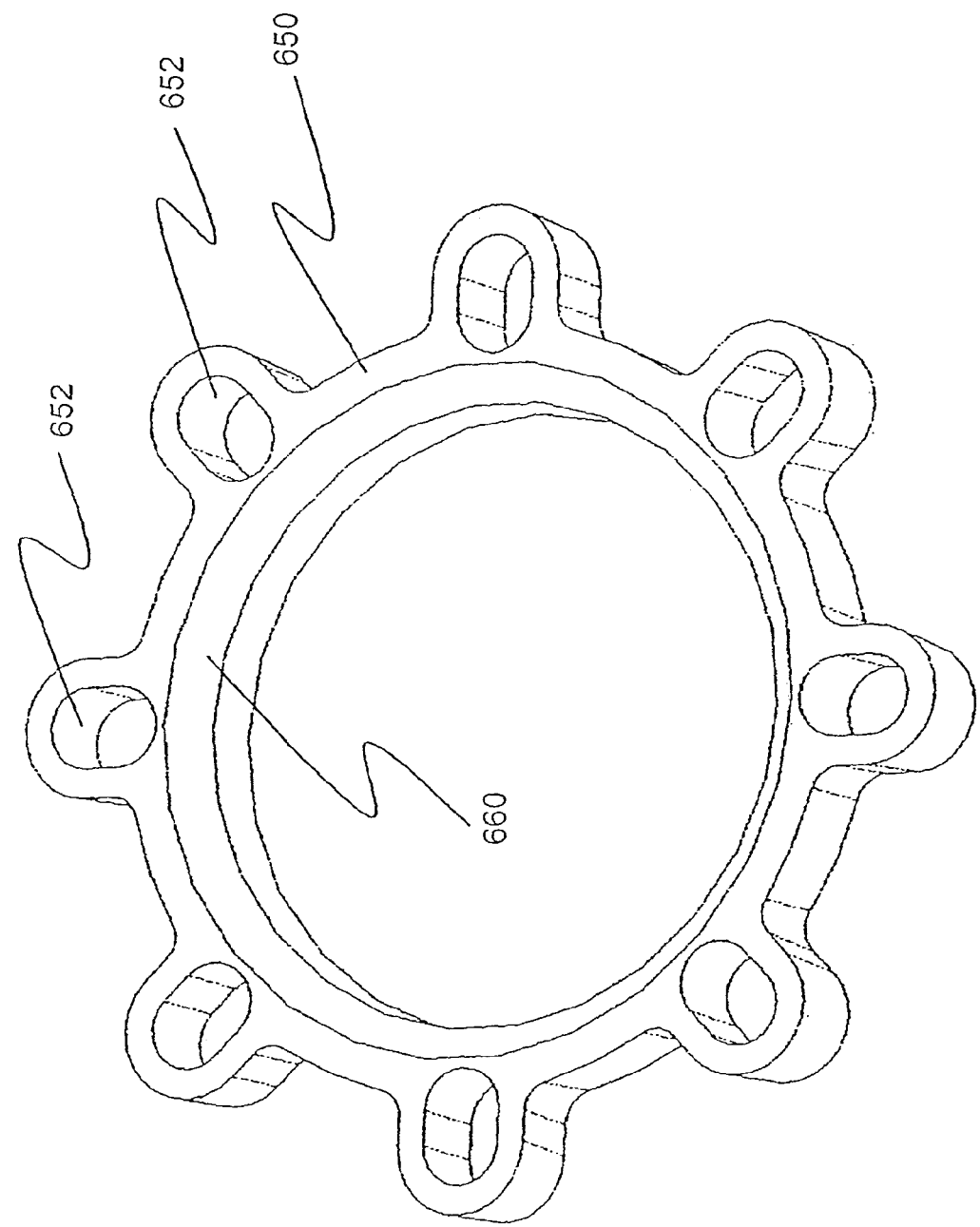
FIG. 11 is a weight reduced metal flange adapter constructed and operative according to the teachings of the present invention.

The above described range and adapter are intended for fabrication from polymer materials, such as glass-filled Nylon, by way of non-limiting example, so as to provide light weight, yet strong, components. If, however, a particular application requires a stronger flange, such as one fabricated from metal, for example, the flange illustrated in FIG. 11 provides an alternative embodiment of a flange of the present invention. Due to the strength of the material from which the flange is fabricated, the flange body 650 is configured as a relatively narrow ring, thereby conserving weight. Circumferentially spaced about the flange body 650 are a plurality of radially elongated bolt slots 652 configured to allow alignment with corresponding attachment elements (bolt holes or bolt studs) of attachment interface components of varying diameters. Note that the adapter interface surface 660 of this flange embodiment is configured as a substantially spherical surface so as to abut the corresponding surface of the flange adapters of the present invention as described above.

It will be appreciated that the above descriptions are intended only to serve as examples, and that many other embodiments are possible within the spirit and the scope of the present invention.

What is claimed is:

1. A diaphragm control valve comprising:
   a) a valve body with an upstream port and a downstream port, and a valve seat formed between said upstream and downstream ports;
   b) a plug housing extending from said valve body between said upstream and downstream ports, at least a portion of an interior volume of said plug housing at least partially defining a control chamber;
   c) a displaceable valve plug at least partially deployed within said plug housing so as to be displaceable between a closed position, in which a sealing portion of said valve plug abuts said valve seat, and an open position, in which said sealing portion of said valve plug is separated from said valve seat; and
   d) a flexible diaphragm sealingly attached to said valve plug, said diaphragm sealing said control chamber from at least a portion of said downstream port, said diaphragm having a substantially "S" shaped cross section such that a distance of said valve plug displacement within said plug housing on each side of a central plane of attachment between said diaphragm and said plug housing is at least about twenty percent of an outer diameter of said diaphragm, providing a total distance of said valve plug displacement within said plug housing of at least about forty percent of an outer diameter of said diaphragm;
   wherein said valve plug is configured to be slidingly longitudinally displaceable within plug housing, and said plug housing further comprises a plurality of substantially longitudinal guide ribs configured on at least one side wall so as to guide said displacement of said valve plug.

2. The diaphragm control valve of claim 1, further comprising a diaphragm support which extends from said valve plug into said control chamber; said diaphragm support configured such that as said diaphragm deforms inwards towards said control chamber said diaphragm support restricts said deformation.

3. The diaphragm control valve of claim 1, wherein a ratio of a thickness of said diaphragm to a radial distance between said valve plug and said plug housing is substantially within a range of 1:4 to 1:7.

4. The diaphragm control valve of claim 1, wherein a longitudinal axis of said plug housing and a longitudinal axis of said downstream port form an acute angle.

5. The diaphragm control valve of claim 4, wherein at least a portion of said plug housing is integrally formed with said valve body.

6. The diaphragm control valve of claim 1, wherein said sealing portion of said valve plug is configured as an elastomeric sealing element.

7. The diaphragm control valve of claim 1, wherein said diaphragm is further configured so as to be sealingly attached to at least one wall of said plug housing.

8. The diaphragm control valve of claim 1, wherein said control chamber is configured as a substantially cylindrical volume which varies as a function of said displacement of said valve plug.

9. The diaphragm control valve of claim 8, wherein said valve plug is configured as a substantially cylindrical element.

10. The diaphragm control valve of claim 1, wherein said diaphragm has a substantially S shaped cross section extending between a first attachment bead and a second attachment bead, said diaphragm configured so as to deform toward and away from of said control chamber as said valve plug is displaced between said open and said closed positions.

11. The diaphragm control valve of claim 10, wherein said diaphragm is configured such that in a non-stressed state the diaphragm is axially non-overlapping and rotationally symmetrical.

12. The diaphragm control valve of claim 11, wherein said cross sectional S shape is configured such that in a non-stressed state the diaphragm extends from said first attachment bead substantially radially inward in a first direction through a first curve, continues substantially non-radially in a second direction through a second curve and continues in a substantially radially inward direction terminating in a second attachment bead.

13. The diaphragm control valve of claim 12, wherein said diaphragm extends substantially perpendicularly from a substantially cylindrical wall of said plug housing and said diaphragm extends substantially perpendicularly from a substantially cylindrical wall of said valve plug.

14. The diaphragm control valve of claim 13, wherein said attachment of said diaphragm to said substantially cylindrical wall of said plug housing is implemented as entrapment of said first attachment bead of said diaphragm between said plug housing and a plug housing cover such that said control chamber is defined substantially by said plug housing cover, said diaphragm and at least a portion of said valve plug.

15. The diaphragm control valve of claim 14, wherein said attachment of said diaphragm to said valve plug is implemented as entrapment of said second attachment bead of said diaphragm between a valve plug body and said diaphragm support.

16. The diaphragm control valve of claim 15, wherein said displacement of said valve plug includes displacement of said second attachment bead such that a length of maximum displacement both towards and away from said valve seat is equidistant from said first attachment bead a position of which is stationary.

17. The diaphragm control valve of claim 1, wherein said valve plug further comprises a corresponding number of plug guide elements configured to slidingly engage corresponding said guide ribs.

18. The diaphragm control valve of claim 1, wherein said plug housing further comprises a variable valve-plug-restriction element configured vary the amount of displacement of the valve plug into the plug housing.

19. A diaphragm control valve comprising:
   a) a valve body with an upstream port and a downstream port, and a valve seat formed between said upstream and downstream ports;
   b) a plug housing extending from said valve body between said upstream and downstream ports, at least a portion of an interior volume of said plug housing at least partially defining a control chamber;

c) a rigid valve plug displaceably deployed within said plug housing, said valve plug being displaceable between a closed position, in which a sealing portion of said valve plug abuts said valve seat, and an open position, in which said sealing portion of said valve plug is separated from said valve seat; and d) a flexible diaphragm integrally molded to said rigid valve plug, said diaphragm sealing said plug housing from at least a portion of said downstream port, said diaphragm having a substantially "S" shaped cross section configured so as to deform from one side of a central plane of attachment between said diaphragm and said plug housing to another side of said plane of attachment as said valve plug is displaced between said open and said closed positions.

20. The diaphragm control valve of claim 19, further comprising a diaphragm support which extends from said valve plug into said control chamber; said diaphragm support configured such that as said diaphragm deforms inwards towards said plug housing said diaphragm support restrict said deformation to a region between said diaphragm support and at least one wall of said plug housing.

21. The diaphragm control valve of claim 19, wherein said diaphragm configured such that a distance of said valve plug displacement within said plug housing is at least about forty percent of a diameter of said plug housing.

22. The diaphragm control valve of claim 19, wherein a ratio of a thickness of said diaphragm to a radial distance between said valve plug and said plug housing is substantially within a range of 1:4 to 1:7.

23. The diaphragm control valve of claim 19, wherein said valve plug is configured to be slidingly longitudinally displaceable within said plug housing.

24. The diaphragm control valve of claim 23, wherein said plug housing further comprises a plurality of substantially longitudinal guide ribs configured on at least one side wall so as to guide said displacement of said valve plug.

25. The diaphragm control valve of claim 24, wherein said valve plug further comprises a corresponding number of guide elements configured to slidingly engage corresponding said guide ribs.

26. The diaphragm control valve of claim 23, wherein said plug housing further comprises a variable valve-plug-restriction element configured vary the amount of displacement of the valve plug into the plug housing.

27. The diaphragm control valve of claim 19, wherein said diaphragm is further configured so as to be sealingly attached to at least one wall of said plug housing.

28. The diaphragm control valve of claim 19, wherein a longitudinal axis of said plug housing and a longitudinal axis said downstream port form an acute angle.

29. The diaphragm control valve of claim 28, wherein at least a portion of a housing containing said plug housing is integrally formed with said valve body.

30. The diaphragm control valve of claim 29, wherein said control chamber is configured as a substantially cylindrical volume which varies as a function of said displacement of said valve plug.

31. The diaphragm control valve of claim 30, wherein said valve plug is configured as a substantially cylindrical element.

32. The diaphragm control valve of claim 31, wherein said diaphragm extends substantially perpendicularly from a substantially cylindrical wall of said plug housing and said diaphragm extends from a substantially cylindrical wall of said valve plug.

33. The diaphragm control valve of claim 32, wherein said attachment of said diaphragm to said substantially cylindrical wall of said plug housing is implemented as entrapment of an attachment bead of said diaphragm between a plug housing and a plug housing cover such that said control chamber is defined substantially by said plug housing cover, said diaphragm and at least a portion of said valve plug.

34. The diaphragm control valve of claim 33, wherein said diaphragm is configured such that in a non-stressed state the diaphragm is axially non-overlapping and rotationally symmetrical.

35. The diaphragm control valve of claim 34, wherein said diaphragm is configured with a cross sectional S shape such that in a non-stressed state the diaphragm extends from said first attachment bead substantially radially inward in a first direction through a first curve, continues substantially non-radially in a second direction through a second curve and continues in a substantially radially inward direction terminating at said molded attachment to said valve plug.

36. The diaphragm control valve of claim 35, wherein said displacement of said valve plug is such that a length of maximum displacement both towards and away from said valve seat is equidistant from said first attachment bead a position of which is stationary.

37. The diaphragm control valve of claim 19, wherein said integral formation of said diaphragm with said valve plug further comprises a plurality of spaced apart passages extending longitudinally through a wall of said valve plug.

38. The diaphragm control valve of claim 37, wherein said passages extending longitudinally through a wall of said valve plug to a region proximal to said sealing portion of said valve plug and said sealing portion is thereby configured as an elastomeric sealing element integrally formed with said valve plug.

39. A diaphragm control valve comprising:

a) a valve body with an upstream port and a downstream port;

b) a plug housing extending from said body between said upstream and downstream ports;

c) a valve plug displaceably deployed within said plug housing;

d) a diaphragm sealingly attached to said valve plug;

e) at least one connection surface configured on at least one of said upstream and downstream ports;

f) an adapter connected to said at least connection surface; and g) a flange which fits over said adapter so as to connect the valve to a flow conduit, the interface of said flange and said adapter being configured such that said flange and said adapter have corresponding generally spherical shaped surfaces, such that said flange is provided generally spherical freedom of movement about said adapter.

40. The diaphragm control valve of claim 39, wherein said at least one connection surface is at least two connection surfaces such that at least one of said upstream and downstream ports is configured with thread on portions of both an inside surface and an outside surface so as to be connectable to any one chosen from the group including: inside diameter pipe thread, flanged and flange adapter, PVC glue pipe adapter.

41. A connecting flange comprising:

a) a substantially flat circular collar with a plurality of circumferentially spaced apart radially elongated bolt slots, said collar configured with a first connection interface at a first end of the connection flange; and b) a connection adapter deployed within said collar, said connection adapter configured with a second connection interface at a second end of the connection flange;

wherein an interface of said collar and said adapter is configured such that said collar and said adapter have corresponding generally spherical shaped surfaces, such that said collar is provided generally spherical freedom of movement about said adapter.

42. A diaphragm control valve comprising:

a) a valve body with an upstream port and a downstream port, and a valve seat formed between said upstream and downstream ports;

b) a plug housing extending from said valve body between said upstream and downstream ports, at least a portion of an interior volume of said plug housing at least partially defining a control chamber;

c) a displaceable valve plug at least partially deployed within said plug housing so as to be displaceable between a closed position, in which a sealing portion of said valve plug abuts said valve seat, and an open position, in which said sealing portion of said valve plug is separated from said valve seat; and d) a flexible diaphragm sealingly attached to said valve plug, said diaphragm sealing said control chamber from at least a portion of said downstream port, said diaphragm having a substantially "S" shaped cross section such that a distance of said valve plug displacement within said plug housing on each side of a central plane of attachment between said diaphragm and said plug housing is at least about twenty percent of an outer diameter of said diaphragm, providing a total distance of said valve plug displacement within said plug housing of at least about forty percent of an outer diameter of said diaphragm;

wherein said diaphragm is integrally formed with said valve plug, said diaphragm sealing said plug housing from at least a portion of said downstream, said diaphragm configured so as to deform into and out of said plug housing as said valve plug is displaced between said open and said closed positions.

* * * * *